(12) United States Patent
Cacharelis

(10) Patent No.: US 6,373,543 B1
(45) Date of Patent: Apr. 16, 2002

(54) PROCESS FOR FORMING SILICON LC PIXEL CELL HAVING PLANAR ALIGNMENT LAYERS OF UNIFORM THICKNESS

(75) Inventor: Philip John Cacharelis, Menlo Park, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/356,010

(22) Filed: Jul. 16, 1999

(51) Int. Cl.[7] ............................................. G02F 1/1337
(52) U.S. Cl. ...................... 349/123; 349/122; 349/113; 349/138
(58) Field of Search ................................ 349/113, 122, 349/138, 123

(56) References Cited

U.S. PATENT DOCUMENTS

| | | | |
|---|---|---|---|
| 4,185,894 A | 1/1980 | Hilton et al. | ................ 350/338 |
| 4,391,491 A | 7/1983 | Freer et al. | ................ 350/341 |
| 4,894,351 A | 1/1990 | Batty | ......................... 437/190 |

(List continued on next page.)

OTHER PUBLICATIONS

Bahadur, 1990, World Scientific, Liquid Crystals Applications and Uses vol. 1, pp. 176, 184.*

Mahajan et al., 1992, Pergamon Press, Concise Encyclopedia of Semiconductor Materials & Related Technologies, pp. 246–249.*

Colgan, E.G., et al., "On–chip metallization layers for reflective light valves", J. Res. Develop., vol. 42, No. 3/4, pp. 339–345 (May/Jul. 1998).

Takayam, S., et al., "Effects of Y or Gd addition on the structures and resistivities of Al thin films", J. Vac. Sci. Technol. A 14(4), pp. 2499–2504 (Jul./Aug. 1996).

Takayama, S., et al., "Low resistivity Al–RE (RE=La, Pr, and Nd) alloy thin films with high thermal stability for thin–film–transistor interconnects", J. Vac. Sci. Technol. B 14(5), pp. 3257–3262 (Sep./Oct. 1996).

O'Hara, A., et al., "Planarization of Spatial Light Modulator Silicon Backplanes Using Chemical–Mechanical Polishing", The Institution of Electrical Engineers, pp. 5/1–5/6 (1994).

Castleberry, D. E., et al., "A 1 Mega–Pixel Color a–Si TFT Liquid–Crystal Display", SID 88 Digest, First Ed., May 1987, ISSN 0097–966X, pp. 232–234.

Glueck, J., et al., "Color–TV Projection with Fast–Switching Reflective HAH–Mode Light Valves", SID 92 Digest, ISSN 0097–0966X, pp. 277280.

C. Colpaert, et al., "14.1: Characterization of Conduction in LCDs", SID 97 Digest, pp. 195–198, (1997).

(List continued on next page.)

*Primary Examiner*—Kenneth Parker
*Assistant Examiner*—David Chung
(74) *Attorney, Agent, or Firm*—Stallman & Pollock LLP

(57) ABSTRACT

A pixel cell array for a reflective silicon light valve features a planar surface alignment layer of uniform thickness over the active pixel electrodes. The surface alignment layer is formed by flowing and curing multiple quantities of alignment material. A first quantity of low viscosity alignment material is spun over the surface and settles into trenches between the raised active pixel electrodes. Curing of the first quantity of alignment material forms a lower alignment layer in the trenches, reducing topography offered by the array surface. A second, larger quantity of higher viscosity alignment material is then spun over active pixel electrodes and the lower alignment layer. The second quantity of alignment material is then cured to form a surface alignment layer. Because of reduction in topography of the array surface by the lower alignment layer, the surface alignment layer is both substantially planar and of uniform thickness across the surface of the active pixel electrode. Each of these properties improve the resolution of the pixel cell by reducing misalignment of the LC attributable to topography offered by the surface alignment layer.

10 Claims, 6 Drawing Sheets

U.S. PATENT DOCUMENTS

| | | | | |
|---|---|---|---|---|
| 4,999,619 A | | 3/1991 | Velde | 340/784 |
| 5,473,448 A | | 12/1995 | Yoshinaga et al. | 359/51 |
| 5,491,571 A | * | 2/1996 | Williams et al. | 359/59 |
| 5,515,191 A | | 5/1996 | Swirbel | 359/81 |
| 5,543,946 A | | 8/1996 | Enomoto et al. | 359/87 |
| 5,570,213 A | | 10/1996 | Ruiz et al. | 359/72 |
| 5,652,667 A | * | 7/1997 | Kurogane | 349/42 |
| 5,672,937 A | | 9/1997 | Choi et al. | 313/503 |
| 5,702,871 A | | 12/1997 | Choi et al. | 430/314 |
| 5,706,067 A | | 1/1998 | Colgan et al. | 349/114 |
| 5,754,159 A | | 5/1998 | Wood et al. | 345/102 |
| 5,764,324 A | | 6/1998 | Lu et al. | 349/113 |
| 5,838,715 A | | 11/1998 | Corzine et al. | 372/96 |
| 5,867,237 A | | 2/1999 | Yazaki et al. | 349/86 |
| 6,163,055 A | * | 12/2000 | Hirakata et al. | 257/347 |

OTHER PUBLICATIONS

Naemura, S., et al., "14:2 Liquid–Crystalline Materials for TFT–Addressed Displays with Improved Image–Sticking Properties", SID 97 Digest, pp. 199–202, (1997).

Lien, A., et al., "14:3 Image–Sticking Measurement of LCDs", SID 97 Digest, pp. 203–206, (1997).

Sato, F., et al., "L1:2 High Resolution and Bright LCD Projector with Reflective LCD Panels", SID 97 Digest, pp. 997–1000, (1997).

Sugiura, N., et al., "42.1: Designing Bright Reflective Full–Color LCDs Using an Optimized Reflector", SID 97 Digest, pp. 1011–1014 (1997).

* cited by examiner

PROCESS FOR FORMING SILICON LC PIXEL CELL HAVING PLANAR ALIGNMENT LAYERS OF UNIFORM THICKNESS

BACKGROUND OF THE INVENTION

1. Field of the Invention

The present invention relates to a pixel cell array for silicon LC light valves, and in particular, to a pixel cell array having a planar alignment layer of uniform thickness formed over the active pixel electrodes.

2. Description of the Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye. Two factors dictate the minimum frequency necessary for switching.

The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1 $\mu$m) liquid crystal (LC) transducers. However, thin (<1 $\mu$m) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067 to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

FIG. 1 shows a cross-sectional view of a adjacent pixels of a conventional array for a silicon LC light valve. Array portion 100 includes molecules 102 of liquid crystal (LC) sandwiched between a top plate 104 and a bottom plate 106. Top plate 104 includes a translucent substrate 108, typically glass or plastic, having an underside coating of a transparent, electrically conducting material that forms passive pixel electrode 109.

Bottom plate 106 is formed by the reflective surfaces of the pixel electrodes 112a and 112b. Active electrodes 112a and 112b, and passive electrode 109, are coated with first and second alignment layers 111b and 111a respectively. Alignment layers 111a–b (typically composed of polyimide) provide an anchoring surface for ends 102a of the LC material 102 interposed between the active pixel electrode and the passive pixel electrode. Alignment layers 111a–b are typically scored in order to ensure that LC material 102 is aligned in a particular direction in response to an applied electric field.

The bottom plate 106 is formed by the active reflective metal pixel electrodes 112a and 112b of adjacent pixels 110a and 110b, respectively. Pixel electrodes 112a and 112b are separated and electrically isolated by trenches 118 in inter-pixel regions 119.

Pixel electrodes 112a and 112b lie on top of an upper intermetal dielectric layer 128 that forms a component of interconnect scheme 104. Interconnect 104 overlies capacitor structures 120a and 120b formed within underlying silicon substrate 105. Capacitor structure 120a includes a dielectric layer 162 formed over a double diffused drain (DDD) region 160 created within silicon substrate 105. Capacitor structure 120a further includes a polysilicon contact component 164 formed over dielectric layer 162.

Storage capacitors 120a and 120b are in electrical communication with pixel electrodes 112a and 112b, respectively, through metal via plugs 140, middle interconnect metallization layer 124, and lower interconnect metallization layer 122. Storage capacitors 120a and 120b are controlled by MOS switching transistors 142a and 142b, respectively. MOS switching transistors 142a and 142b are also formed in underlying silicon substrate 105, and are electrically isolated from adjacent semiconducting devices by trench isolation structures 144.

FIGS. 2A–2F illustrate cross-sectional views of the process for forming the conventional thin LC transducer pixel cell shown in FIG. 1.

FIG. 2A illustrates the starting point for the conventional process. Starting structure 200 is created by forming an upper intermetal dielectric layer 128 over a lower interconnect metallization layer (not shown). Portions of upper intermetal dielectric layer 128 corresponding to the center of future pixel regions are then etched to stop on the lower interconnect metallization layer, forming vias. These vias are then filled with electrically conducting material to create via plugs 140, and then the electrically conducting material is removed outside of the vias.

Next, reflective metal electrode layer 112 is formed over upper intermetal dielectric layer 128 and the tops of via plugs 140. Photoresist mask 150 is then patterned over reflective metal electrode layer 112 to expose inter-pixel regions 119.

FIG. 2B shows etching of reflective metal electrode layer 112 in unmasked inter-pixel regions 119 selective to upper intermetal dielectric layer 128, defining discrete reflective pixel electrodes 112a and 112b separated by trench 118. Photoresist mask 150 is then removed.

At this point in the process flow, the chip upon which the pixel array is being formed is transferred from a conventional silicon processing facility to a one that specializes in the handling of liquid crystal material. Prior to introduction of liquid crystal material to the pixel array, a surface must be formed over the active and passive electrodes that permits uniform alignment of liquid crystal material within the cell.

Accordingly, FIG. 2C shows the flowing of a quantity of alignment material 111 over the entire surface, including on top of active reflective pixel electrodes 112a and 112b, and within trench 118. Alignment material 111 is typically formed from polyamic acid, water, and a solvent which is spun onto the wafer in liquid form.

FIG. 2D shows the curing of alignment material 111, during which solvent is removed and alignment material 111 shrinks and hardens to form alignment layer 111*b* conforming to raised active pixel electrodes 112*a* and 112*b*. As shown in FIG. 2D, once alignment layer 111*b* has solidified, the thickness of this layer is non-uniform over the surface of active pixel electrodes. Alignment layer 111*b* includes a thick portion 111*c* at the center of the active pixel electrodes 112*a* and 112*b*.

At this point in the process flow, alignment layer 111*b* is scored by a rubbing wheel, which traverses the surface of the pixel cell and gouges alignment layer 111*b* in a uniform direction.

FIG. 2E shows completion of assembly of the pixel cell by disposing LC material 102 over the active pixel electrodes 112*a* and 112*b*, and then sealing top plate 104 including passive pixel electrode 109 and first alignment layer 111*a* over LC material 102.

FIG. 2F shows the effect of application of a voltage bias to active pixel electrodes 112*a* and 112*b* through via plugs 140. Application of a voltage bias in this manner creates electrical field 150 across LC material 102 between active pixel electrodes 112*a* and 112*b*, and passive pixel electrode 109. The presence of electric field 150 causes LC material 102 to align in a uniform direction anchored at either end by first and second alignment layers 111*a* and 111*b*.

The conventional fabrication process described above in FIGS. 2A–2F is adequate to produce functional thin LC transducer pixel cells. However, the conventional process flow suffers from a serious disadvantage in the formation of an alignment layer having low planarity and non-uniform thickness over the active pixel electrode.

As described above, alignment of the LC material under the influence of an applied electric field is a critical light value attribute. Alignment of the twisted nematic LC dictates polarization of incident light which will pass through the LC. In the context of a complete system, this alignment of the LC material defines either the black or white extreme of the light valve's gray scale.

Liquid crystal material overlying the pixel electrode has the propensity to align and/or tilt with any topology present on the surface of the pixel cell. The increased thickness of the second alignment layer at the center of the active pixel electrode creates topography on the pixel cell surface. As a result, non-uniformity in alignment of LC material due to uneven thickness in the alignment layer will translate into a poorly constructed display.

Therefore, there is a need in the art for a process for forming a thin LC transducer pixel cell that creates a planar alignment layer of uniform thickness on the surface of the active pixel electrode.

SUMMARY OF THE INVENTION

The present invention relates to a pixel cell array and to a process for fabricating a pixel cell array that creates a planar alignment layer of uniform thickness over the active pixel electrode.

Specifically, the process in accordance with a first embodiment of the present invention proposes forming the alignment layer in two stages. A first, small quantity of alignment material having low viscosity is applied in liquid form over the array surface. The low viscosity and small volume of this first quantity of alignment material allows it to settle within the trenches in inter-pixel regions, leaving the reflective array surface substantially free of alignment material. The first quantity of alignment material is then cured to form a hardened lower alignment material within the trenches.

Next, a second, larger quantity of higher viscosity alignment material is flowed over the reflective array surface and the lower alignment layer. Because the lower alignment layer previously formed within the trenches substantially reduces topology offered by the surface of the pixel array, curing of the second quantity of alignment material yields a substantially planar alignment surface of uniform thickness over the active pixel electrodes.

A process flow for forming a pixel cell in accordance with one embodiment of the present invention comprises the steps of forming a plurality of discrete raised active pixel electrodes over an intermetal dielectric layer, the active pixel electrodes separated by trenches, the active pixel electrodes and trenches creating a topography. A first quantity of alignment material in liquid form is flowed over the active pixel electrodes such that the first quantity of alignment material settles within the trenches. The first quantity of alignment material is cured to form a lower alignment layer within the trenches, the lower alignment layer reducing the topography offered by the trenches and the discrete pixel electrodes. A second quantity of alignment material is flowed in liquid form over the discrete pixel electrodes and the lower alignment layer. The second quantity of alignment material is cured to form a planar surface alignment layer of uniform thickness over the discrete pixel electrodes and the lower alignment layer.

An array of pixel cells for a silicon light valve comprises a plurality of raised reflective active pixel electrodes formed on top of an intermetal dielectric layer and electrically isolated from each other by trenches, the plurality of reflective pixel electrodes and the trenches creating a topography. An alignment material is positioned within the trenches and reduces the topology offered by the plurality of active pixel electrodes and the trenches. A surface alignment layer is formed over the plurality of pixel electrodes and the alignment material, the surface alignment layer substantially planar and of substantially constant thickness across a width of the active pixel electrodes.

The features and advantages of the present invention will be understood upon consideration of the following detailed description of the invention and the accompanying drawings

DETAILED DESCRIPTION

The present invention relates to a process for forming a pixel cell for a reflective silicon LC light valve which creates a planar alignment layer of uniform thickness over the active pixel electrode. This is accomplished by forming the alignment layer in two steps. In the first step, a small first quantity of alignment material having low viscosity is flowed over the entire surface of the array, including on top of the active pixel electrodes and within inter-pixel regions. This first quantity of alignment material settles within the trenches between the discrete active pixel electrodes. The first quantity of alignment material is then cured, and a second, larger quantity of higher viscosity alignment material is flowed over the array.

Because inter-pixel regions have already been filled with hardened alignment material during the previous step, thereby reducing topography of the array surface, curing of the second quantity of alignment material results in a highly planar alignment layer having uniform thickness. This constant thickness promotes uniform alignment of the LC in the presence of an applied electric field.

Figure 2A:
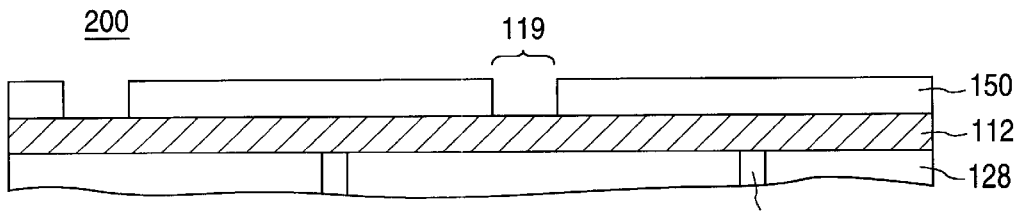
FIGS. 2A–2F show cross-sectional views of the process steps for forming the conventional pixel cell.
Figure 2B:
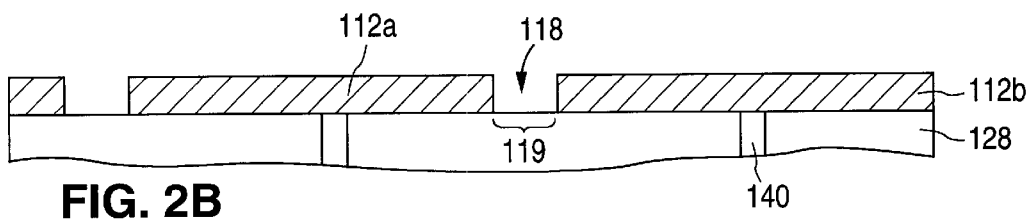
Figure 2C:
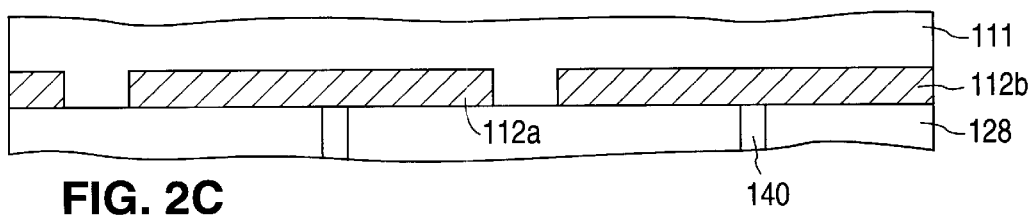
Figure 2D:
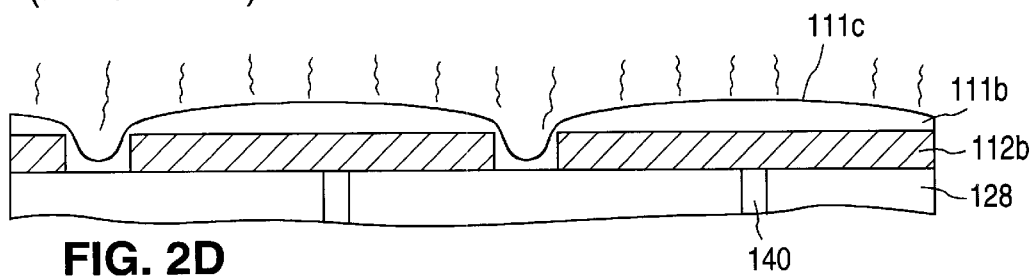
Figure 2E:
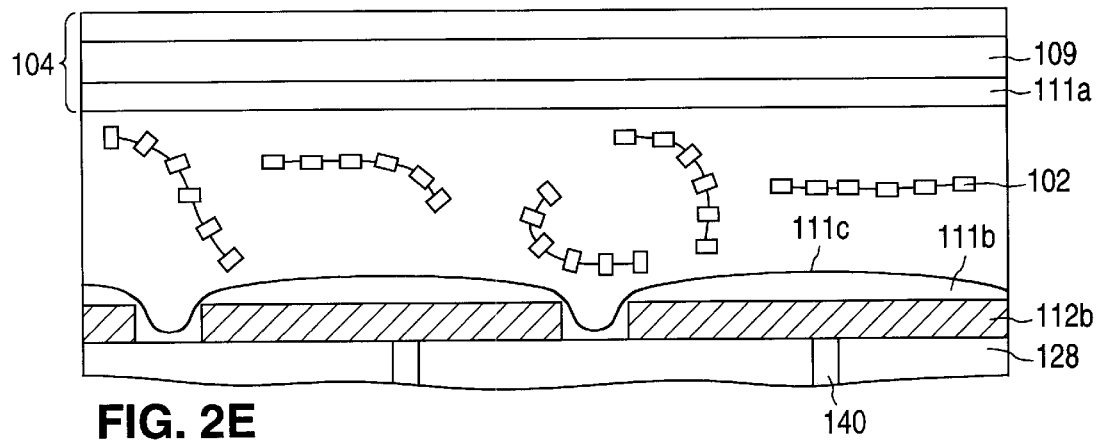
Figure 2F:
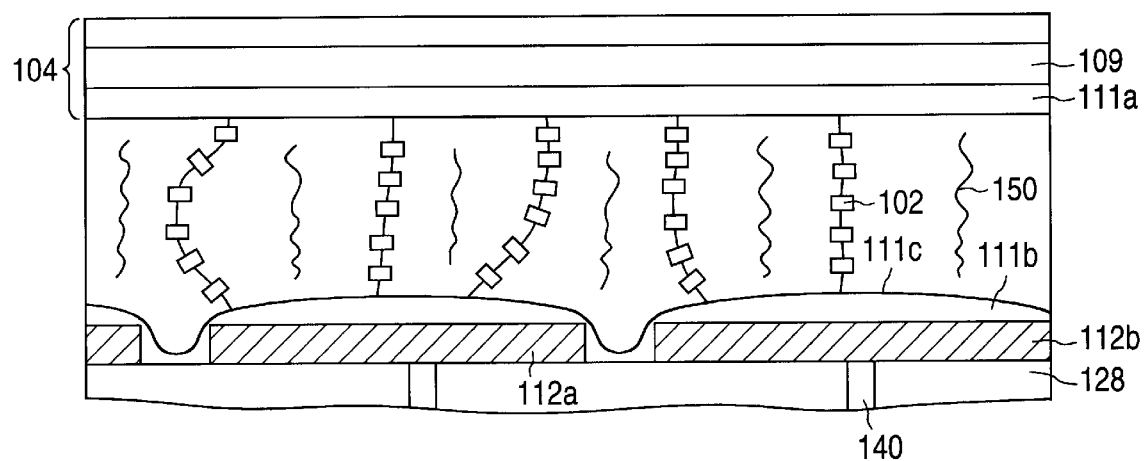
Figure 3:
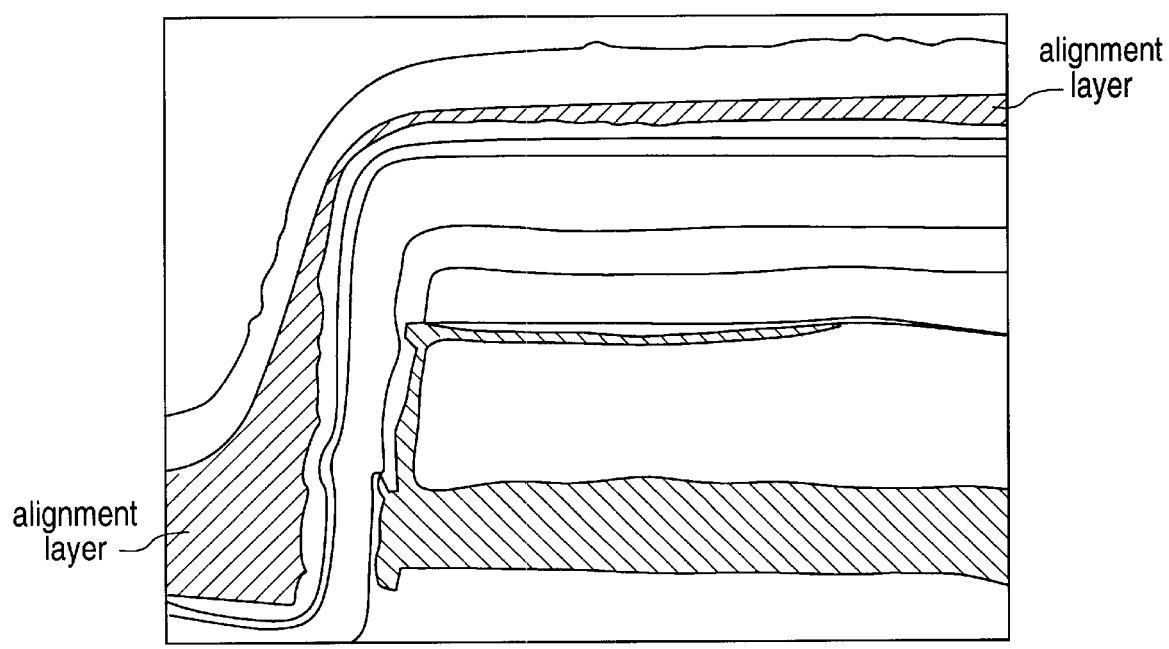
FIG. 3 shows a TEM micrograph of the conventional polyimide alignment layer having varying thickness over the sides and center of an active pixel electrode.

As shown above in FIG. 2D, the conventional single-step process for forming of an alignment layer creates a layer having uneven thickness. This is illustrated in FIG. 3, which is a TEM micrograph of the conventional polyimide alignment layer formed over the sides and center of an active pixel electrode. FIG. 3 shows that the polyimide alignment layer is markedly thinner at the edges of the active pixel electrode than at the electrode center.

Figure 4:
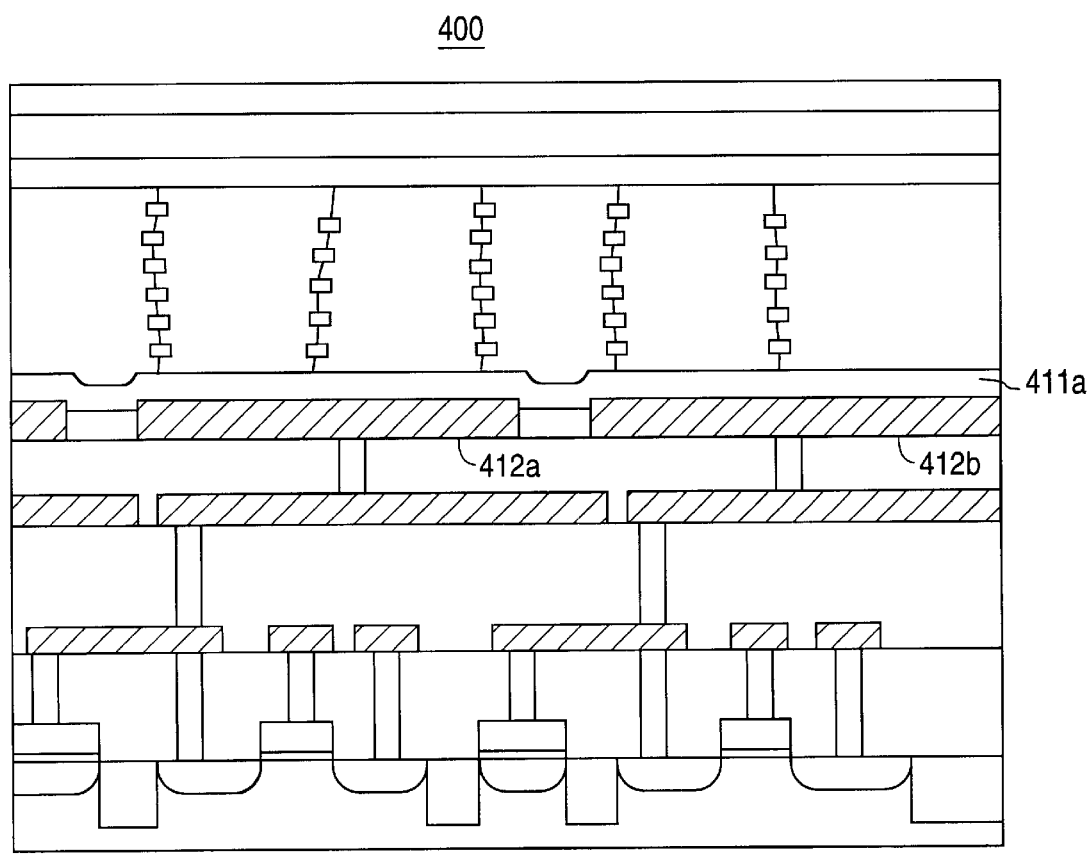
FIG. 4 shows a cross-sectional view of a thin LC transducer pixel cell in accordance with a first embodiment of the present invention.

FIG. 4 shows a cross-sectional view of a thin LC transducer cell in accordance with the present invention. Pixel cell 400 of FIG. 4 is identical to the conventional cell shown in FIG. 1, except that surface alignment layer 411c is substantially planar and has constant thickness over the width of the active pixel electrodes 412a and 412b. This is in contrast to alignment layer 111b of conventional pixel cell 100, which is of varying thickness and conforms to the topography created by the raised active pixel electrodes and the intervening trenches FIGS. 5A–5H illustrate cross-sectional views of the process for forming a thin LC transducer pixel cell in accordance with a first embodiment of the present invention.

Figure 5A:
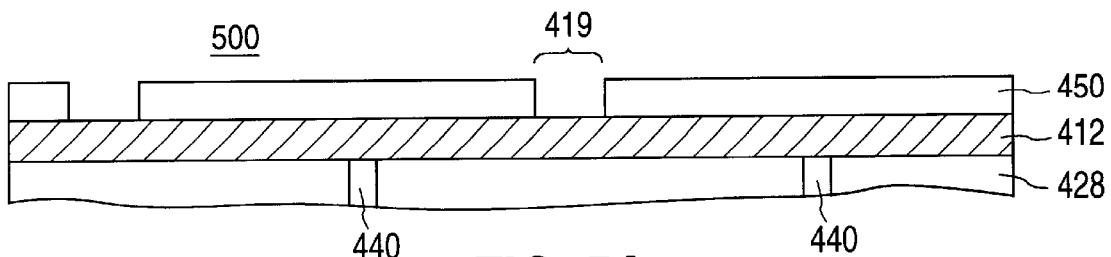
FIGS. 5A–5H show cross-sectional views of the process steps for forming a thin LC transducer pixel cell in accordance with a first embodiment of the present invention.

FIG. 5A illustrates the starting point for the process flow in accordance with the present invention. Starting structure 500 is created by forming an upper intermetal dielectric layer 428 over a lower interconnect metallization layer (not shown). Portions of upper intermetal dielectric layer 428 corresponding to the center of future pixel regions are etched to stop on the lower interconnect metallization layer, forming vias. These vias are then filled with electrically conducting material to create via plugs 440, and then the electrically conducting material is removed outside of the vias.

Next, a reflective metal electrode layer 412 is formed over upper intermetal dielectric layer 428 and the tops of via plugs 440. A photoresist mask 450 is then patterned over reflective metal electrode layer 412 which excludes inter-pixel regions 419.

Figure 5B:
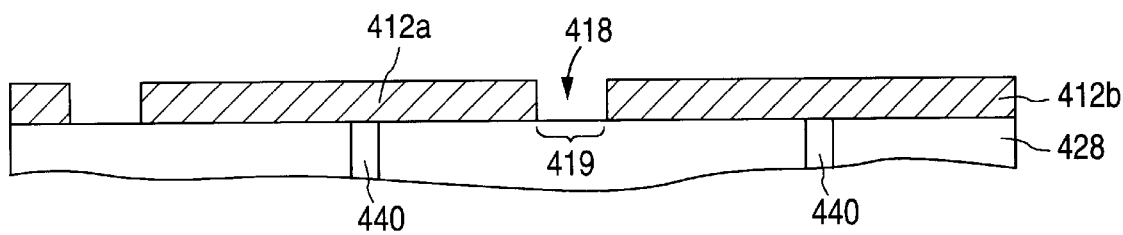

As shown in FIG. 5B, reflective metal electrode layer 412 is then etched in unmasked inter-pixel regions 419 selective to upper intermetal dielectric layer 428, defining discrete reflective pixel electrodes 412a and 412b separated by trench 418.

Traditional silicon processing concludes with removal of photoresist mask 450. The wafer featuring the array of discrete reflective pixel electrodes is then typically transferred to a specialized facility devoted to handling of liquid crystal material.

Figure 5C:
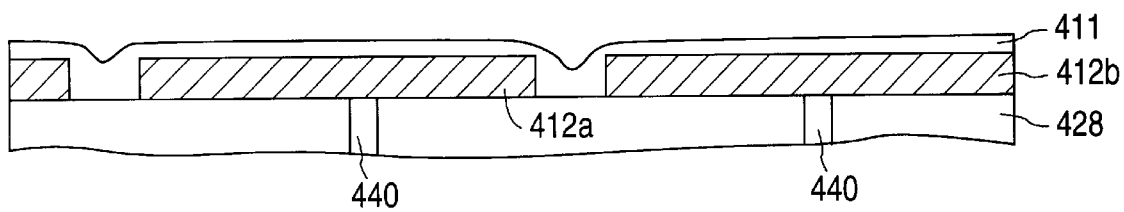

FIG. 5C shows flowing of a first quantity 411 of liquid alignment material over the entire surface of the array, including over active pixel electrodes 412a and 412b, and within trench 418. A smaller volume of liquid alignment material is employed during this step as compared with the prior art process.

The liquid alignment material is typically a combination of polyamic acid dissolved in water and a solvent vehicle. Polyamic acid is a solid, and varying its concentration in the overall mixture affects overall viscoslty of the liquid alignment material. A lower concentration of polyamic acid is utilized in the first quantity of alignment material, in order to reduce viscosity and thereby facilitate penetration of alignment material into the trenches.

Figure 5D:
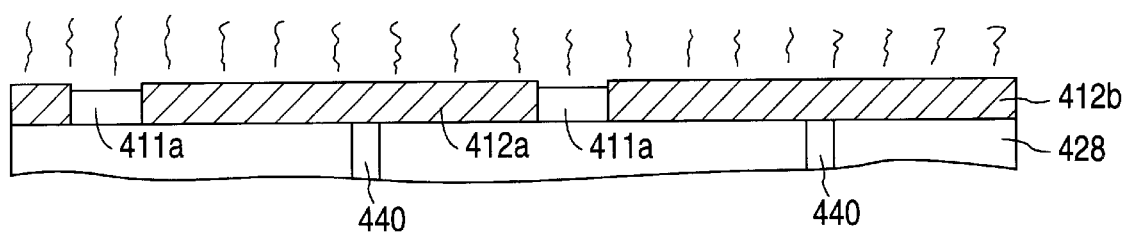
Figure 5E:
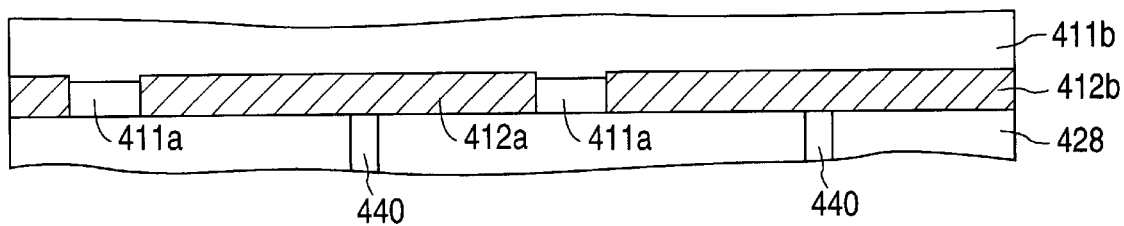

FIG. 5D shows settling of the first quantity of liquid alignment material into trenches 418, and curing at 150° C. for 30 min, and at 300° C. for 1 hr. As a result of this curing step, the polyamic acid is converted into polyimide, the solvent is driven off, and first quantity 411 of alignment material shrinks and hardens to form lower alignment layer 411a within trenches 418. The presence of hardened lower alignment layer 411a within trenches 418 reduces the overall topography exhibited by the surface of the pixel array FIG. 5E shows the next step in the process flow, wherein second quantity 411b of alignment material is flowed over active electrodes 412a and 412b, and lower alignment layer 411a. Again, because second quantity 411b of alignment material is in liquid form, the alignment material penetrates into any recesses remaining after formation of lower alignment layer 411a.

Second quantity 411b of the alignment material ultimately hardens to form the surface alignment layer interacting directly with the liquid crystal In order to ensure formation of a surface alignment layer having a high degree of planarity and uniform thickness, second quantity 411b of alignment material contains a higher concentration of polyamic acid, elevating its viscosity. Moreover, second quantity 411b of alignment material has a greater volume as compared with first quantity 411 of alignment material.

Figure 5F:
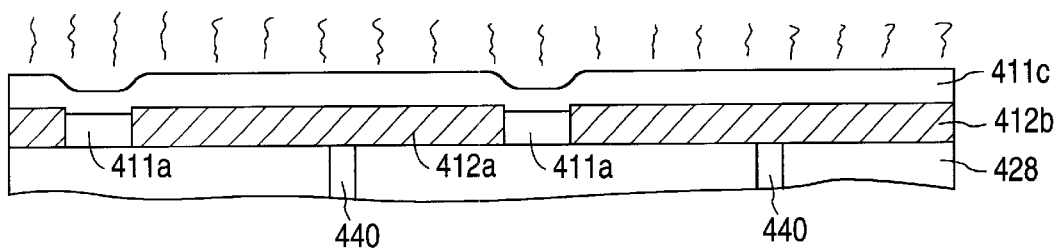

FIG. 5F shows a second curing step, wherein solvent is removed from second quantity 411b of alignment material, which then converts to polyimide and hardens to form surface alignment layer 411c. Because lower alignment layer 411a has previously been formed within trenches 418, the topology of the array surface is significantly reduced, and surface alignment layer 411c is formed over an already substantially planarized surface. Surface alignment layer 411c therefore possesses a high degree of planarity and a relatively uniform thickness across the width of active pixel electrodes 412a and 412b.

At this point in the process, surface alignment layer 411c is scored by a rubbing wheel. This wheel traverses the surface of the pixel cell and gouges surface alignment layer 411c in a uniform direction.

Figure 5G:
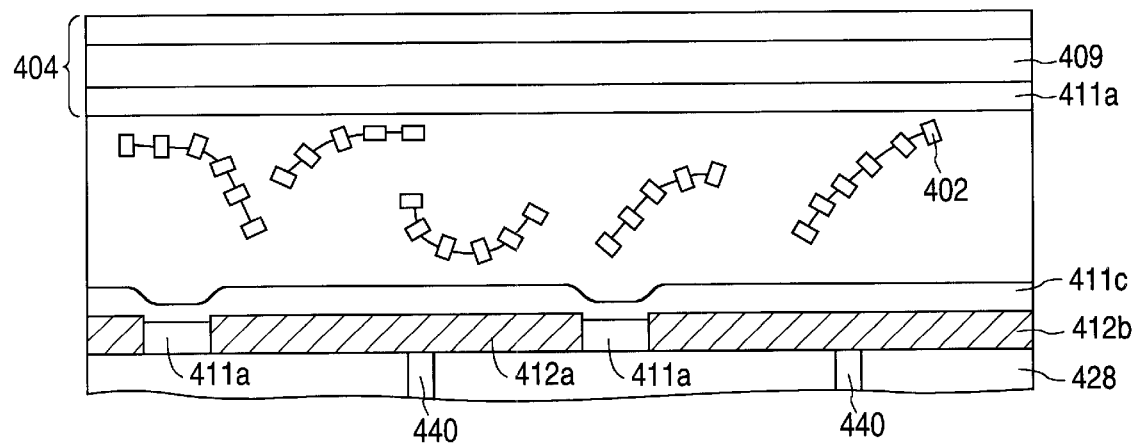

FIG. 5G shows completion of assembly of the pixel cell by disposing LC material 402 over the active pixel electrodes 412a and 412b, and then sealing top plate 404 including passive pixel electrode 409 and third alignment layer 411d over the LC material 402.

Figure 5H:
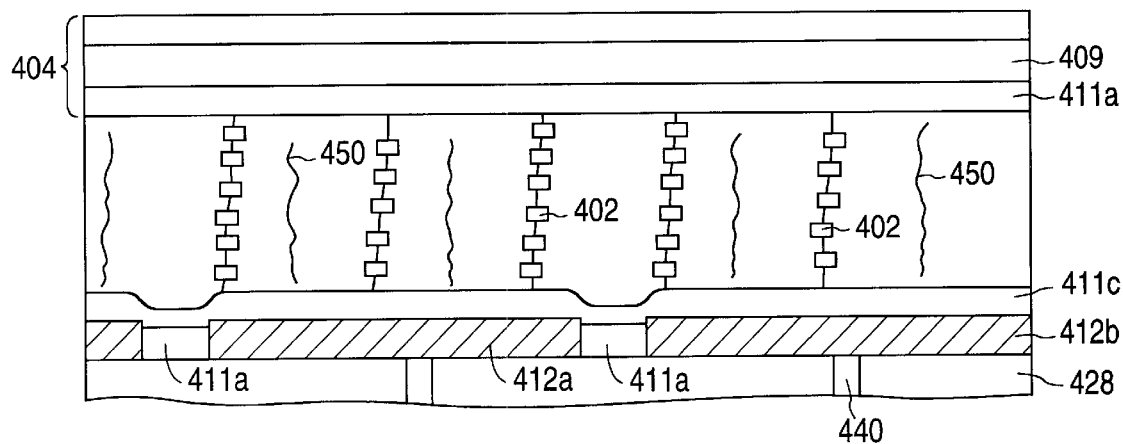
Figure 1:
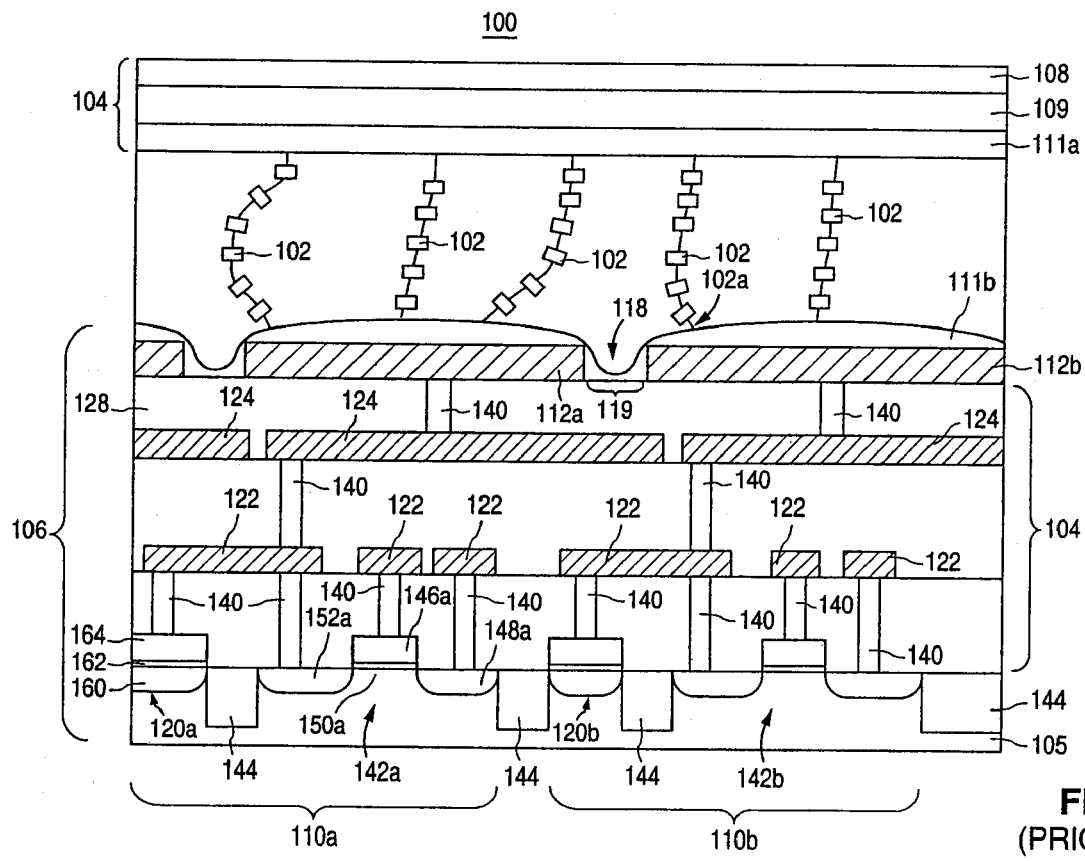

FIG. 5H shows the effect of application of a voltage bias to active pixel electrodes 412a and 412b through via plugs 440. Application of a voltage bias in this manner creates electrical field 450 across LC material 402 between active pixel electrodes 412a and 412b, and passive pixel electrode 409. The presence of electric field 450 causes LC material 402 to become aligned in a uniform direction, anchored at either end by surface alignment layer 411c and third alignment layer 411d.

One important advantage offered by the thin LC transducer pixel cell in accordance with the present invention is improved resolution. Where the alignment layer is nonplanar (as in the conventional pixel cell shown in FIG. 1) the overlying LC will conform to topography presented by the alignment layer. As a result, uniform alignment of the LC molecules will be disrupted, and the pixel will not exhibit a full range of contrast.

Moreover, where the alignment layer is not of uniform thickness, the distance between the ends of the aligned LC material and the surface of the active pixel electrode will vary. This variation may translate into different electrical field strengths at different locations within a pixel, or at different pixels of the same array. This variation in field strength would also act to reduce the range of contrast available to the pixel cell.

The surface alignment layer formed over the active electrodes of the pixel cell of the present invention is both planar and of substantially constant thickness. Therefore, uniform alignment of LC material in the presence of an applied electric field will not be disrupted, and the pixel cell will exhibit a full range of contrast.

Another important advantage offered by the present invention is ready compatibility with existing process flows. As discussed above, the alignment layer is generally formed at the conclusion of conventional silicon processing that creates active pixel electrodes on the surface of the array.

The present invention does not significantly alter this process flow, merely proposing multiple applications of alignment material to the wafer once traditional silicon processing has concluded. No additional masking or etching steps are required, and planarization of the array surface is accomplished using the same material (polyimide) already called for by the liquid crystal processing phase.

Although the invention has been described in connection with one specific preferred embodiment, it must be understood that the invention as claimed should not be unduly limited to this specific embodiment. Various other modifications and alterations in the process and array will be apparent to those skilled in the art without departing from the scope of the present invention.

For example, while FIGS. 5A–5H depict formation of the alignment layer over the active pixel electrodes using a successive two layer process, the invention is not limited to this specific embodiment.

For example, more than two layers of polyimide material could be utilized to form a planar alignment surface. In a first alternative embodiment of the present invention, first and second small quantities of low viscosity alignment material could be successively flowed into inter-electrode trenches and cured to form the lower alignment layer. This would further reduce array topography prior to formation of the surface alignment layer utilizing a third, larger quantity of alignment material having high viscosity.

Moreover, in a second alternative embodiment of the present invention, a sacrificial etchback process could be employed after formation of the lower alignment layer. In such an alternative process flow, a larger volume of low viscosity alignment material could first be flowed over the raised active electrodes to settle within the trenches and remain over the surfaces of the active pixel electrodes. After curing, this first alignment layer could be etched under carefully controlled conditions (i.e. to stop on the active electrode surface). An surface alignment layer subsequently formed over this etched surface would also exhibit planarity and uniform thickness due to reduction in underlying topography by the first quantity of alignment material.

However, one disadvantage of this second alternative embodiment is exposure of the reflective surfaces of the active pixel electrodes to etch conditions, which could degrade their reflectance. One way of avoiding this problem would be to exercise sufficiently precise control over the etchback step to ensure that etching is halted just short of the surface of the reflective active pixel electrodes.

Given the specific embodiments of the present invention described above, it is intended that the following claims define the scope of the present invention, and that the methods and structures within the scope of these claims and their equivalents be covered hereby.

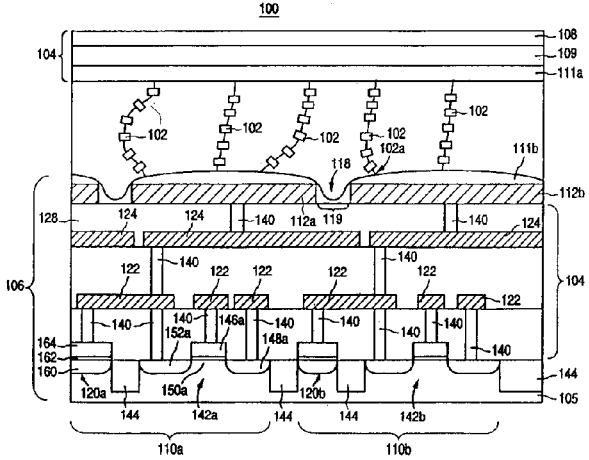

What is claimed is:

1. A method of forming an array of pixel cells for a silicon light valve, the method comprising:

forming a plurality of discrete raised active pixel electrodes over an intermetal dielectric layer, the active pixel electrodes separated by trenches, the active pixel electrodes and trenches creating a topography;

flowing a first quantity of a first material in liquid form over the active pixel electrodes such that the first quantity of first material settles within the trenches, the first material having a first viscosity;

curing the first quantity of first material to form a lower layer within the trenches, the lower layer reducing the topography offered by the trenches and the discrete pixel electrodes;

flowing a second quantity of second material in liquid form over the discrete pixel electrodes and the lower layer, the second alignment material having a second viscosity, the first quantity being smaller than the second quantity, the first viscosity being lower than the second viscosity; and curing the second quantity of second material to form a planar surface layer of uniform thickness over the discrete pixel electrodes and the lower layer.

2. The method of claim 1, and wherein:

the step of flowing a first quantity of first alignment material comprises flowing polyamic acid in a solvent; and the step of curing the first quantity of first alignment material comprises heating the polyamic acid to remove the solvent and convert the liquid polyamic acid into solid polyimide.

3. The method of claim 1, and wherein:

the step of flowing a second quantity of second material comprises flowing polyamic acid in a solvent; and the step of curing the second quantity of second material comprises heating the polyamic acid to remove the solvent and convert the liquid polyamic acid into solid polyimide.

4. The method of claim 1, and wherein:

the step of flowing a first quantity of first material comprises flowing polyamic acid in a solvent;

the step of curing the first quantity of first material comprises heating the polyamic acid to remove the solvent and convert the liquid polyamic acid into solid polyimide;

the step of flowing a second quantity of second material comprises flowing polyamic acid in a solvent; and the step of curing the second quantity of second material comprises heating the polyamic acid to remove the solvent and convert the liquid polyamic acid into solid polyimide.

5. The method of claim 4, and further comprising the steps of:

flowing a third quantity of third material in liquid form over the active pixel electrodes and the lower layer prior to the step of flowing the second quantity of second material, such that the third quantity of second material settles within the trenches over the lower layer; and curing the third quantity of third material to form a second lower alignment layer on top of the first lower layer and within the trenches, the second lower layer further reducing the topography offered by the trenches and the discrete pixel electrodes.

6. The method of claim 1, and further comprising:

etching back the lower alignment layer a predetermined distance prior to flowing the second quantity of alignment material.

7. A pixel cell formed by the method of claim 1.

8. A pixel cell formed by the method of claim 1.

9. An array of pixel cells for a silicon light valve comprising:

a plurality of raised reflective active pixel electrodes formed on top of an intermetal dielectric layer and electrically isolated from each other by trenches, the plurality of reflective pixel electrodes and the trenches creating a topography;

material positioned within the trenches and reducing the topography offered by the plurality of active pixel electrodes and the trenches; and a surface layer formed over the plurality of pixel electrodes and the material, the surface layer substantially planar and of substantially constant thickness across a width of the active pixel electrodes, wherein the alignment material comprises a plurality of layers.

10. The array of claim 9, and wherein the material and the surface layer are composed of polyimide.

* * * * *

UNITED STATES PATENT AND TRADEMARK OFFICE
CERTIFICATE OF CORRECTION

PATENT NO. : 6,373,543 B1
DATED : April 16, 2002
INVENTOR(S) : Cacharelis

It is certified that error appears in the above-identified patent and that said Letters Patent is hereby corrected as shown below:

Title page,
The title page showing the illustrative figure, shoud be deleted and substitute therefor the attached title page.

Figure 1:
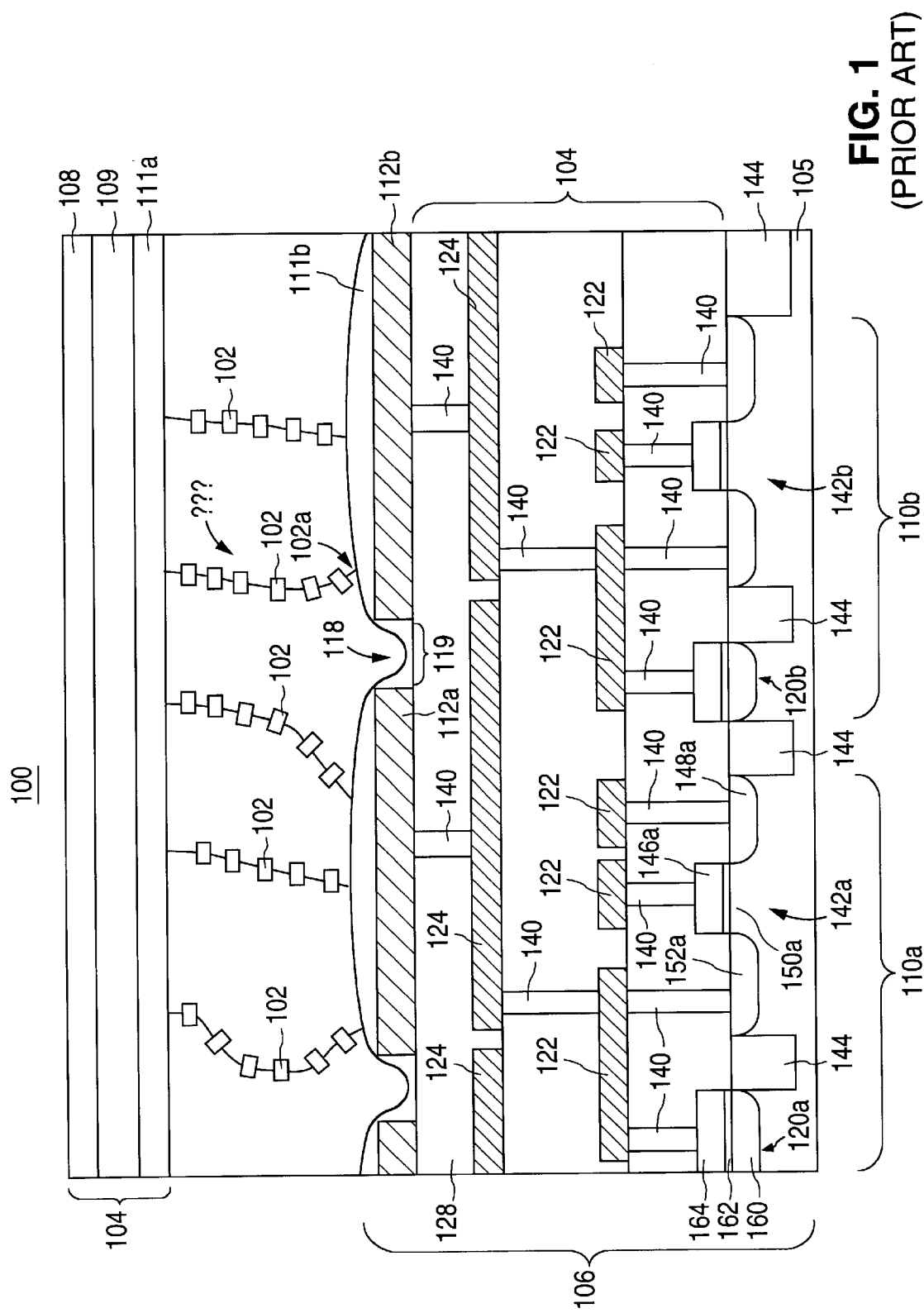
FIG. 1 shows a cross-sectional view of a conventional thin LC transducer pixel cell.

Drawings,
Delete Fig. 1, and substitute therefor Fig 1, as shown on the attached page.

Signed and Sealed this

Thirtieth Day of July, 2002

Attest:

JAMES E. ROGAN
Attesting Officer      Director of the United States Patent and Trademark Office

(12) United States Patent
Cacharelis

(10) Patent No.: US 6,373,543 B1
(45) Date of Patent: Apr. 16, 2002

(54) PROCESS FOR FORMING SILICON LC PIXEL CELL HAVING PLANAR ALIGNMENT LAYERS OF UNIFORM THICKNESS

(75) Inventor: Philip John Cacharelis, Menlo Park, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/356,010

(22) Filed: Jul. 16, 1999

(51) Int. Cl.[7] ............................................. G02F 1/1337
(52) U.S. Cl. ...................... 349/123; 349/122; 349/113; 349/138
(58) Field of Search ................................ 349/113, 122, 349/138, 123

(56) References Cited

U.S. PATENT DOCUMENTS

| | | | |
|---|---|---|---|
| 4,185,894 A | 1/1980 | Hilton et al. | ............... 350/338 |
| 4,391,491 A | 7/1983 | Freer et al. | ................... 350/341 |
| 4,894,351 A | 1/1990 | Batty | ........................... 437/190 |

(List continued on next page.)

OTHER PUBLICATIONS

Bahadur, 1990, World Scientific, Liquid Crystals Applications and Uses vol. 1, pp. 176, 184.*

Mahajan et al., 1992, Pergamon Press, Concise Encyclopedia of Semiconductor Materials & Related Technologies, pp. 246–249.*

Colgan, E.G., et al., "On-chip metallization layers for reflective light valves", J. Res. Develop., vol. 42, No. 3/4, pp. 339–345 (May/Jul. 1998).

Takayam, S., et al., "Effects of Y or Gd addition on the structures and resistivities of Al thin films", J. Vac. Sci. Technol. A 14(4), pp. 2499–2504 (Jul./Aug. 1996).

Takayama, S., et al., "Low resistivity Al–RE (RE=La, Pr, and Nd) alloy thin films with high thermal stability for thin–film–transistor interconnects", J. Vac. Sci. Technol. B 14(5), pp. 3257–3262 (Sep./Oct. 1996).

O'Hara, A., et al., "Planarization of Spatial Light Modulator Silicon Backplanes Using Chemical–Mechanical Polishing", The Institution of Electrical Engineers, pp. 5/1–5/6 (1994).

Castleberry, D. E., et al., "A 1 Mega–Pixel Color a–Si TFT Liquid–Crystal Display", SID 88 Digest, First Ed., May 1987, ISSN 0097–966X, pp. 232–234.

Glueck, J., et al., "Color–TV Projection with Fast–Switching Reflective HAH–Mode Light Valves", SID 92 Digest, ISSN 0097–0966X, pp. 277280.

C. Colpaert, et al., "14.1: Characterization of Conduction in LCDs", SID 97 Digest, pp. 195–198, (1997).

(List continued on next page.)

Primary Examiner—Kenneth Parker
Assistant Examiner—David Chung
(74) Attorney, Agent, or Firm—Stallman & Pollock LLP

(57) ABSTRACT

A pixel cell array for a reflective silicon light valve features a planar surface alignment layer of uniform thickness over the active pixel electrodes. The surface alignment layer is formed by flowing and curing multiple quantities of alignment material. A first quantity of low viscosity alignment material is spun over the surface and settles into trenches between the raised active pixel electrodes. Curing of the first quantity of alignment material forms a lower alignment layer in the trenches, reducing topography offered by the array surface. A second, larger quantity of higher viscosity alignment material is then spun over active pixel electrodes and the lower alignment layer. The second quantity of alignment material is then cured to form a surface alignment layer. Because of reduction in topography of the array surface by the lower alignment layer, the surface alignment layer is both substantially planar and of uniform thickness across the surface of the active pixel electrode. Each of these properties improve the resolution of the pixel cell by reducing misalignment of the LC attributable to topography offered by the surface alignment layer.

10 Claims, 6 Drawing Sheets